(12) United States Patent
Dexheimer et al.

(10) Patent No.: US 8,374,733 B2
(45) Date of Patent: Feb. 12, 2013

(54) TRANSPORTATION INFORMATION MANAGEMENT SYSTEM

(75) Inventors: Ronald H. Dexheimer, Sunrise Beach, MO (US); Raymond D. Shinneman, Jupiter, FL (US)

(73) Assignee: Myfligtdata, LLC, Jupiter, FL (US)

( * ) Notice: Subject to any disclaimer, the term of this patent is extended or adjusted under 35 U.S.C. 154(b) by 642 days.

(21) Appl. No.: 12/542,084

(22) Filed: Aug. 17, 2009

(65) Prior Publication Data

US 2011/0040428 A1 Feb. 17, 2011

Related U.S. Application Data

(60) Provisional application No. 60/089,395, filed on Aug. 15, 2008.

(51) Int. Cl.
*G01C 23/00* (2006.01)

(52) U.S. Cl. ............ 701/3; 701/14; 701/16; 701/301; 701/408; 340/961; 340/945; 340/963; 340/971; 342/29; 342/36; 342/37; 342/38; 342/454; 707/999.1; 707/999.2; 707/999.204; 707/999.205

(58) Field of Classification Search .............. 701/3, 4, 701/16, 14; 340/961, 945, 963, 971; 342/29, 342/36, 37, 38, 454, 455, 456; 707/999.1, 707/999.2, 999.204, 999.205
See application file for complete search history.

(56) References Cited

U.S. PATENT DOCUMENTS

| | | | |
|---|---|---|---|
| 5,890,079 A * | 3/1999 | Levine | 701/14 |
| 6,094,608 A | 7/2000 | Bomans | |
| 6,278,913 B1 | 8/2001 | Jiang | |
| 6,466,888 B1 | 10/2002 | McCool et al. | |
| 6,473,794 B1 * | 10/2002 | Guheen et al. | 709/223 |
| 6,480,770 B1 | 11/2002 | Wischmeyer | |
| 6,856,864 B1 | 2/2005 | Gibbs et al. | |
| 6,885,340 B2 | 4/2005 | Smith et al. | |
| 7,123,192 B2 | 10/2006 | Smith et al. | |
| 7,158,978 B2 * | 1/2007 | Goodwin | 707/640 |
| 7,203,630 B2 * | 4/2007 | Kolb et al. | 703/6 |
| 2004/0107125 A1 * | 6/2004 | Guheen et al. | 705/7 |
| 2005/0187677 A1 * | 8/2005 | Walker | 701/16 |
| 2010/0073197 A1 * | 3/2010 | Eagleton et al. | 340/945 |
| 2011/0040428 A1 * | 2/2011 | Dexheimer et al. | 701/3 |

* cited by examiner

*Primary Examiner* — Redhwan K Mawari
(74) *Attorney, Agent, or Firm* — Law Office of Mark Brown, LLC; Mark E. Brown

(57) ABSTRACT

A computer-implemented transportation information management system and method permits entry, recording, and transmission of operation and maintenance data related to FAA recordkeeping and recording requirements within an SQL database. A secure website permits entry and display of operation and maintenance data as well as facilitating data input using input devices such as a cellular telephone, a personal digital assistant, a personal computer, and a portable computer. The system outputs aircraft operation and maintenance data, automatic alerts of pilot flight and duty time limitations, and flight tracking and monitoring information via a spreadsheet, electronic mail message, text message, and a completed FAA mandatory reporting requirement forms to the aforementioned data input devices. Operation and maintenance data is automatically and continuously transferred to the FAA to populate FAA flight tracking data systems and air traffic control data system.

4 Claims, 1 Drawing Sheet

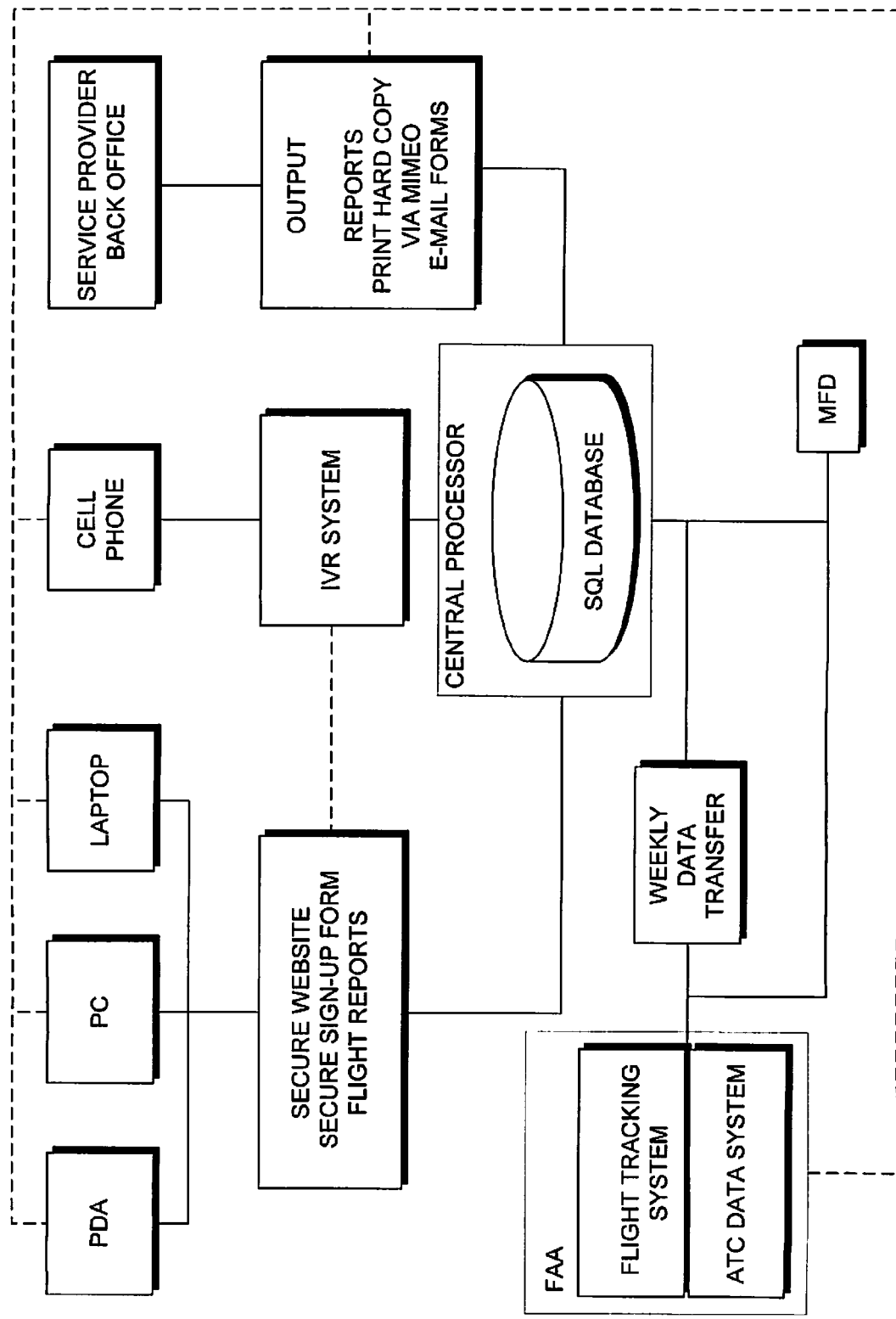

TRANSPORTATION INFORMATION MANAGEMENT SYSTEM

CROSS REFERENCE TO RELATED APPLICATION

This application claims priority in provisional application No. 60/089,395, filed Aug. 15, 2008, which is incorporated herein by reference.

BACKGROUND OF THE INVENTION

1. Field of the Invention

The present invention relates generally to aircraft operation data management and in particular to an automated recordkeeping system for aircraft owners and operators.

2. Description of the Related Art

The Federal Aviation Administration (FAA) is responsible for the safety and efficiency of aviation in the United States of America. The FAA issues and enforces regulations regarding the operation and maintenance of aircraft. Compliance with the regulations requires record keeping by the aircraft owners and operators, and submission of such records to the FAA.

Operation and maintenance data subject to FAA recordkeeping and recording requirements includes, but is not limited to: pilot logbook entries; flight and duty time reports; personnel and aircraft flight time limitations; air crew medical information; rest requirements; duty and maintenance schedules, deadlines, operation limits, and reporting; training and maintenance due dates, and training requirements and compliance. Problems can arise for smaller operators who create and maintain records, for example, in paper format, which requires multiple redundant manual entries. The breadth and depth of the data subject to FAA recordkeeping and reporting requirements are extensive and time consuming. The resulting complexity can affect the safety and efficiency of aircraft operations.

Major airlines such as scheduled commercial carriers, and cargo haulers that fly large cargo aircraft, can design and manage the infrastructure necessary to comply with FAA reporting requirements. However, air carriers such as commuter airlines and on-demand carriers often do not have the capability of designing and maintaining an electronic and automated recording system.

Heretofore there has not been available a system or method for automated recordkeeping and data collection for aircraft owners and operators with the advantages and features of the present invention.

BRIEF DESCRIPTION OF THE INVENTION

In the practice of the present invention, a system and method is provided for automated record keeping and data collection of aircraft operation and maintenance information to facilitate compliance with FAA regulatory requirements and increase efficiency of aircraft operations. In one embodiment of the invention, a system is provided for automated recordkeeping and data collection of aircraft operation and maintenance data, including: means for inputting and displaying aircraft operation, maintenance, and flight tracking data; means for receiving the data from a plurality of input devices; means for capturing and archiving the data; and means for outputting the data to input devices and the FAA.

In another exemplary embodiment is a method of automated recordkeeping and data collection of aircraft operation and maintenance data comprising: inputting aircraft operation, maintenance, and flight tracking data; receiving the data from a plurality of input devices; capturing and archiving the data on a computer-readable media; and generating output data for display on input devices and transmission to the FAA.

In another exemplary embodiment, an aspect of the invention is directed to one or more computer-readable media embodying computer-usable instructions for presenting a secure graphical user interface.

BRIEF DESCRIPTION OF THE DRAWINGS

The drawings constitute a part of this specification and include exemplary embodiments of the present invention and illustrate various objects and features thereof.

FIG. 1 is a schematic, block diagram of a transportation information management system embodying the present invention.

DETAILED DESCRIPTION OF THE PREFERRED EMBODIMENT

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

As used herein, "operation and maintenance data" means information subject to FAA recordkeeping and recording requirements which includes, but is not limited to: pilot logbook entries; flight plans; flight and duty time reports; personnel and aircraft flight time limitations; air crew medical information; rest requirements; duty and maintenance schedules, deadlines, operation limits, and reporting; training and maintenance due dates; and training requirements and compliance.

II. Transportation Information Management System and Method 2

Referring to FIG. 1, the reference numeral 2 generally designates a transportation information management system and method embodying the present invention. The system 2 includes a central processor 12 with an SQL database 14. The hardware components of the central processor 12, can comprise any of a number of suitable hardware devices which are commercially available and are suitable for this application. The central processor 12 can be programmed in any suitable manner utilizing any of a variety of commercially available programming languages and software development systems.

The central processor 12 is adapted to receive input, such as operation and maintenance data, and flight tracking data from any number of sources such as a secure website 4, an interactive voice response (IVR) system 18, the FAA 20, a multi function device (MFD) 28, and a back office service provider 30. Input is thereby captured and archived by the SQL database 14 as data. Aircraft owners and operators may query and mine the data using tools comprising data analysis software.

The secure website 4 is accessed using a secure log-in and operably connected to the central processor 12, and operates as both an input interface and display interface for data on the SQL database 14. The secure website 4 is adapted to receive and display instrument flight rules (IFR), flight data tracking, and operation and maintenance data utilizing one or more input devices, such as a cell phone 5, personal digital assistant (PDA) 6, personal computer (PC) 8, or laptop computer 10.

The IVR system 18 is operably connected to the central processor 12, and is adapted to receive visual flight rules (VFR) information in the form of voice or data from the air crew using an input device such as a cell phone 5. An optional connection can exist between the secure website 4 and the IVR system 18 whereby data can be transmitted.

A MFD 28 interfaces with both the FAA 20, and the central processor 12, and operates as both an input and display interface for data on the FAA 20 and SQL database 14. The MFD 28 permits an air crew to transmit operation and maintenance data directly to the FAA 20 or central processor 12. The MFD 28 can comprise any number of electronic communication devices such as a personal digital assistant, personal computer, laptop computer, or smart phone.

A back office service provider 30 is operably connected to the central processor 12 for input and maintenance of data captured and archived on the SQL database 14.

The central processor 12 captures and archives operational and maintenance data, and flight tracking data in the SQL database 14, and generates output 32. The data can be processed in any number of ways generating output 32 in any number of formats, such as, but not limited to operation and maintenance data, automatic alerts of pilot flight and duty time limitations, flight tracking and monitoring information, flight monitoring, and automatic alerts. Optionally, the data can be transmitted to any number of display devices such as a PDA 6, PC 8, laptop computer 10, or cell phone 5, for viewing or correction. The data comprising the output 32 can be formatted in any number of ways, such as, reports, spreadsheets, completed mandatory reporting requirement forms, electronic mail, or text messages. As an additional option, the output 32 is transmitted to the FAA 20 to satisfy regulatory operation and maintenance reporting requirements thereby increasing the accuracy and reliability of mandatory reporting compliance.

The FAA 20 interfaces with the central processor 12, whereby data from a flight tracking system 22, and an air traffic control (ATC) data system 24 is transmitted by a live data transfer 26. Operation and maintenance data, and flight tracking data is continuously transmitted to the FAA 20 by the central processor 12 from information captured and archived on the SQL database 14. The central processor 12 automatically populates operation and maintenance data reports required by the FAA 20.

It will be appreciated that the components of the transportation information management system can be used for various other applications.

It is to be understood that while certain aspects of the invention have been shown and described, the invention is not limited thereto and encompasses various other embodiments and aspects.

Having thus described the disclosed subject matter, what is claimed as new and desired to be secured by Letters Patent is:

1. A computer-implemented transportation information management system, comprising:
    aircraft operation maintenance data, said aircraft operation maintenance data comprising at least one of a pilot logbook entry, a flight plan, a flight time report, a duty time report, a personnel flight time limitation, an aircraft flight time limitation, air crew personnel medical information, an air crew personnel rest requirement, a duty schedule, a maintenance schedule, a maintenance deadline, an operational limit, a reporting due date, an air crew personnel training due date, a maintenance due date, a training requirement, and a training compliance report;
    a first computing device having a central processor, said central processor operably connected to a structured query language (SQL) database, said SQL database storing said aircraft operation maintenance data;
    a secure website having a secure log-in, said secure website operably connected to said first computing device, said secure website providing input and display of said aircraft operation maintenance data;
    a second computing device operably connected to said secure website, said second computing device providing input and visual display of said aircraft operation maintenance data;
    said first computing device providing output of said aircraft operation maintenance data;
    an FAA flight system, said FAA flight system comprising a flight tracking data system and an air traffic control (ATC) data system;
    a live data transfer;
    said aircraft operation maintenance data being continuously transmitted to said FAA flight system by said live data transfer, said aircraft operation maintenance data populating said flight tracking data system and said ATC data system;
    said second computing device comprises at least one of a cellular telephone, a personal digital assistant, a personal computer, and a portable computer;
    said output comprising aircraft operation and maintenance data, automatic alerts of pilot flight and duty time limitations, or flight tracking and monitoring information;
    said output in the form of at least one of a report, a spreadsheet, an electronic mail message, a text message, and a completed FAA mandatory reporting requirement form; and
    said output displayed on said second computing device.

2. A computer-implemented transportation information management system of claim 1, further comprising an interactive voice response system (IVS), said IVS operably connected to said first computing device and said secure website, said IVS adapted to receive visual flight rules (VFR) information from said second computing device.

3. A computer-implemented transportation information management system of claim 2, further comprising a multi-function device (MFD), said MFD transmitting said aircraft operation maintenance data directly to said FAA system or said first computing device, said MFD comprising at least one of a cellular telephone, a personal digital assistant, a personal computer, and a portable computer.

4. A computer-implemented transportation information management system of claim 2, further comprising:
    a back office service provider, said back office service provider operably connected to said first computing device; and
    said back office service provider providing input and visual display of said aircraft operation maintenance data.

* * * * *